United States Patent Office 3,194,819
Patented July 13, 1965

---

3,194,819
2,2-DICYANO-3,3-DI(POLYFLUOROHALOALKYL)-OXIRANES
William J. Middleton, Wilmington, Del., assignor to E. I. du Pont de Nemours and Company, Wilmington, Del., a corporation of Delaware
No Drawing. Filed Mar. 29, 1963, Ser. No. 269,141
3 Claims. (Cl. 260—348)

This invention is concerned with a new class of negatively substituted oxiranes (olefin oxides) and a process for their preparation.

The products of this invention are the 2,2-dicyano-3,3-di(polyfluorohaloalkyl)oxiranes. They are prepared in high yield and pure form by the action of an organic peracid on the corresponding 1,1-dicyano-2,2-di(polyfluorohaloalkyl)ethylenes.

The process and products of this invention may be illustrated by the equation:

(1) 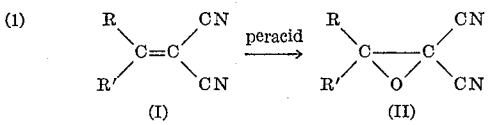

wherein R and R' each represent perfluoroalkyl, ω-chloroperfluoroalkyl or ω-hydroperfluoroalkyl, each of up to 18 carbon atoms (i.e., 18 carbons or less), and R and R' conjointly are perfluoroalkylene of 3 to 8 carbon atoms, particularly hexafluorotrimethylene, octafluorotetramethylene and decafluoropentamethylene. Particularly preferred are the compounds of Formula II in which the separate R and R' groups are perfluoroalkyl of up to 8 carbons.

The molecular proportions in which the organic peracid compounds and 1,1-dicyano-2,2-di(polyfluorohaloalkyl) ethylenes are brought together in the process of this invention may be varied widely, for example, from 19:1 to 1:19, since within this range at least some of the desired oxirane will be obtained. For practical yields and reasonable economy of starting materials, it is preferred that the mole ratio of peracid to the cyanopolyfluorohaloalkylethylene be at least 7:10 and preferably in the range of 7:10 to 10:3. Highest yields are obtained when the ratio is 1:1.

The peracids employed in this invention are conveniently introduced into the reaction mixture in the form of solutions either in water or a water-miscible organic liquid which is inert to the reactants and products. The presence of such a liquid is preferred though not essential. Organic liquids particularly suitable for this use include acetonitrile, acetone, acetic acid, tetrahydrofuran, ethylene glycol dimethyl ether, dioxane, dioxolane, methanol, and ethanol. The concentration of the peracid in the reaction mixture may be varied widely, i.e., from 1% to 90% and above.

Organic peracids useful in this invention include performic acid, peracetic acid, pertrifluoroacetic acid, perbenzoic acid, monoperphthalic acid, and the like.

Pressure is not a critical factor in this process. Pressures both above and below atmospheric pressure are operable, and atmospheric pressure is preferred for convenience.

The reaction of this invention can be carried out over a wide range of temperatures. By adjusting the proportions of the several components in the reaction mixture so that none will be frozen out, temperatures as low as −80° C. may be employed. By using slightly elevated pressure to maintain the liquid phase, temperatures as high as 150° C. may be used. It is generally preferred, however, to carry out the reaction of this invention in the temperature range from −20 to +50° C.

The 1,1-dicyano-2,2-di(polyfluorohaloalkyl)ethylene starting materials for the process of this invention are prepared by dehydration of the corresponding hydroxy(di [polyfluorohaloalkyl])methylmalononitriles, which in turn are obtained by the reaction of malononitrile with the corresponding polyfluorohaloalkyl ketone. These preparations are indicated by the following equations:

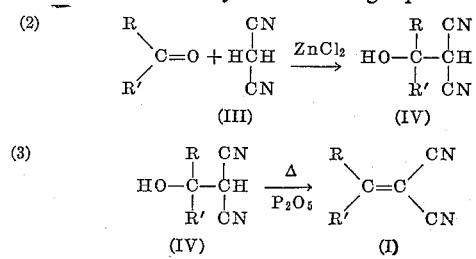

in which R and R' are as defined above.

The reaction of a polyfluorohaloalkyl ketone and malononitrile is conveniently carried out in the presence of zinc chloride as catalyst at a temperature in the range of about 50 to about 150° C. The resultant hydroxy compound (Formula IV) is usually a crystalline solid which can be isolated and purified in a conventional manner, or which may be used directly (without purification) in the dehydration reaction to form the corresponding 1,1-dicyano-2,2-di(polyfluorohaloalkyl)ethylene.

Dehydration of the hydroxy[di(polyfluorohaloalkyl)]-methylmalononitrile (IV) is readily accomplished by heating it, preferably in the presence of a water acceptor, i.e., a substance that will react with or otherwise retain water. A dehydrating agent such as phosphorus pentoxide is of particular advantage as a water acceptor, and with use of such a dehydrating agent the product is conveniently separated as it is formed by distillation from the reaction vessel. Alternatively, the dehydration can be carried out in a vapor phase process in which the vaporized hydroxy compound is passed through a porous layer of a solid water acceptor, e.g., silica gel. The dehydration can also be accomplished by heating the hydroxy compound in the absence of a water acceptor, but since the dehydration reaction is reversible, this method of operation is impractical unless an alternative method of separating the water from the ethylenic compound is used, e.g., fractional distillation.

The temperature of dehydration is generally above about 100° C., and when the product tis removed by distillation the reaction temperature will be somewhat above the boiling point of the product. However, the temperature of dehydration is not critical and can be quite high, e.g. ,above 300° C., since the 1,1-dicyano-2,2-di(polyfluorohaloalkyl)ethylene products are thermally stable.

In the examples which follow, parts are by weight unless otherwise indicated. Example I represents the preferred embodiment of the invention.

EXAMPLE I

*Part A*

A mixture of 750 parts of malononitrile, 40 parts of anhydrous zinc chloride, and 1500 parts of hexafluoroacetone is heated in a closed pressure vessel at 80° C. for eight hours. An off-white crystalline solid, 2110 parts is obtained after the reactor is cooled and vented. It is recrystallized from methylene chloride to give hydroxybis(trifluoromethyl)methylmalononitrile as hygroscopic white needles, M.P. 59–70° C.

*Part B*

A mixture of 2110 parts of hydroxybis(trifluoromethyl) methylmalononitrile and 4540 parts of phosphorus pentoxide is heated strongly in a simple still until no further distillate is collected. The distillate is filtered and redistilled to give 970 parts of 1,1-dicyano-2,2-bis(trifluoromethyl)ethylene: B.P. 107°; $n_D^{25}$, 1.3526; $D_4^{25}$, 1.479.

Part C 1,1 - dicyano - 2,2 - bis(trifluoromethyl)ethylene (428 parts) is added slowly to 400 parts of 40% peracetic acid in acetic acid. The mixture is stirred and cooled, and the rate of addition is adjusted so that the temperature does not rise above 50° C. At the end of the addition about 20 parts of mercaptoacetic acid is added to destroy excess peracetic acid. The reaction mixture is distilled and a fraction boiling from 75–98° C. is collected. Redistillation gives 355 parts of 2,2-dicyano-3,3-bis(trifluoromethyl)oxirane in the form of a colorless liquid boiling at 96° C. which solidifies to a colorless solid melting at 46–47° C. The fluorine n-m-r spectrum contains a single, unsplit, resonance band.

*Anal.*—Calcd. for $C_6F_6N_2O$: C, 31.32; F, 49.55; N, 12.18. Found: C, 30.71; F, 48.86; N, 11.05.

When the fluoroalkyl ketones indicated in Table I are substituted for hexafluoroacetone in the procedure of Parts A and B of Example I and the resulting indicated 1,1-dicyano-2,2-di(fluoroalkyl)ethylene is oxidized with peracetic acid as in the procedure of Part C, the indicated 2,2 - dicyano-3,3-di(fluoroalkyl)oxiranes are respectively obtained.

infrared spectrum, which is identical with that of an authentic sample.

Also, the oxiranes of this invention are useful for adding a dicyanomethylene substituent to the sulfur atom of thiocarbamoyl compounds. They have thus paved the way for the preparation of dicyano-S-(diaminomethylene)sulfilidene which, when applied to paper, renders it useful for inkless printing. This is illustrated below in Example B.

EXAMPLE B

A mixture of 1184 parts of ethyl alcohol, 76 parts of thiourea, and 230 parts of 2,2-dicyano-3,3-bis(trifluoromethyl(oxirane is stirred at room temperature until solution is complete. An exothermic reaction occurs, and the reaction mixture warms spontaneously to 50° C. Ether, 7135 parts, is added, and the precipitate that forms is collected on a filter and washed with ether. Recrystallization from alcohol-ether gives 110 parts (79% yield) of dicyano-S-(diaminomethylene)sulfilidene $$(NC)_2C=S=C(NH_2)_2$$

as colorless prisms, M.P. 114–5° C. (dec., black).

A sheet of porous paper of about 64 cm.² in area (9 cm. filter paper) was thoroughly saturated with a solution prepared by dissolving 0.1 g. of $(NC)_2C=S=C(NH_2)_2$ in 5 ml. of acetone. The paper was allowed to dry. The ap-

TABLE I

| Fluoroalkyl ketone | 1,1-dicyano-2,2-di(fluoroalkyl)ethylene | 2,2-dicyano-3,3-di(fluoroalkyl)oxirane |
|---|---|---|
| Hexafluorocyclobutanone | Dicyanomethylenehexafluorocyclobutane | 2,2-dicyano-4,4,5,5,6,6-hexafluoro-1-oxaspiro[2.3]hexane. |
| Octafluorocyclopentanone | Dicyanomethyleneoctafluorocyclopentane | 2,2-dicyano-4,4,5,5,6,6,7,7-octafluoro-1-oxaspiro[2.4]heptane. |
| Decafluorocyclohexanone | Dicyanomethylenedecafluorocyclohexane | 2,2-dicyano-4,4,5,5,6,6,7,7,8,8-decafluoro-1-oxaspiro[2.5]octane. |
| Decafluoro-3-pentanone | 1,1-dicyano-2,2-bis(pentafluoroethyl)-ethylene | 2,2-dicyano-3,3-bis(pentafluoroethyl) oxirane. |
| Decafluoro-2-pentanone | 1,1-dicyano-2-heptafluoropropyl-2-trifluoromethylethylene. | 2,2-dicyano-3-heptafluoropropyl-3-trifluoromethyloxirane. |
| Perfluoro-3-decanone | 1,1-dicyano-2-perfluoroethyl-2-perfluoroheptylethylene. | 2,2-dicyano-3-perfluoroethyl-3-perfluoroheptyloxirane. |
| Perfluoro-8-penta-decanone | 1,1-dicyano-2,2-bis(perfluoroheptyl)-ethylene | 2,2-dicyano-3,3-bis(perfluoroheptyl)oxirane. |
| Perfluoro-2-nonadecanone | 1,1-dicyano-2-perfluoroheptadecyl-2-perfluoromethylethylene. | 2,2-dicyano-3-perfluoroheptadecyl-3-perfluoromethyloxirane. |
| Perfluoro-18-pentatriacontanone | 1,1-dicyano-2,2-bis(perfluoroheptadecyl) ethylene. | 2,2-dicyano-3,3-bis(perfluoroheptadecyl) oxirane. |
| 1,3-dichloro-1,1,3,3-tetrafluoro-2-propanone | 1,1-dicyano-2,2-bis(chlorodifluoromethyl) ethylene. | 2,2-dicyano-3,3-bis(chlorodifluoromethyl) oxirane. |
| 1,9-dichloroperfluoro-5-nonanone | 1,1-dicyano-2,2-bis(4-chloroperfluorobutyl) ethylene. | 2,2-dicyano-3,3-bis(4-chloroperfluorobutyl) oxirane. |
| 1,13-dichloroperfluoro-7-tridecanone | 1,1-dicyano-2,2-bis(6-chloroperfluorohexyl) ethylene. | 2,2-dicyano-3,3-bis(6-chloroperfluorohexyl) oxirane. |
| 1H-pentafluoro-2-propanone | 1,1-dicyano-2-difluoromethyl-2-trifluoromethylethylene. | 2,2-dicyano-3-difluoromethyl-3-trifluoromethyloxirane. |
| 1H,3H-tetrafluoro-2-propanone | 1,1-dicyano-2,2-bis(difluoromethyl)-ethylene | 2,2-dicyano-3,3-bis(difluoromethyl) oxirane. |
| 1H,17H-perfluoro-5-heptadecanone | 1,1-dicyano-2-(4H-perfluorobutyl)-2-(12H-perfluorododecyl)ethylene | 2,2-dicyano-3-(4H-perfluorobutyl)-3-(12H-perfluorododecyl)oxirane. |
| 1H,25H-perfluoro-13-pentacosanone | 1,1-dicyano-2,2-bis(12H-perfluorododecyl) ethylene. | 2,2-dicyano-3,3-bis(12H-perfluorododecyl) oxirane. |

The 2,2-dicyano-3,3-di(polyfluorohaloalkyl)oxiranes of this invention are useful as agents for introducing a dicyanomethylene substituent on a nitrogen atom in organic compounds. For example, they all react with pyridine to yield N-dicyanomethylenepyridine. This is illustrated in Example A.

EXAMPLE A

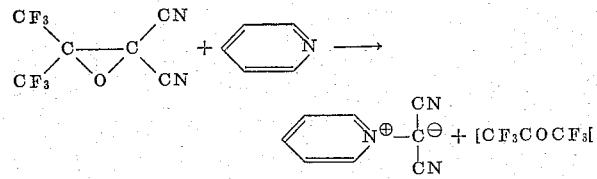

A solution of 79 parts of pyridine in 714 parts of ether is added slowly to a cooled solution of 230 parts of 2,2-dicyano-3,3-bis(trifluoromethyl)oxirane in 1070 parts of ether. A vigorous exothermic reaction occurs. The yellow precipitate that forms is collected on a filter, washed with ether, and recrystallized from alcohol to give 125 parts of N-dicyanomethylenepyridine as light yellow needles, M.P. 245–246°. The product is identified by its pearance of the paper was unchanged after this treatment. The treated paper was placed on a wooden block. Clean type (copper penny) was heated to 150° C. and pressed against the paper for one second. A brown, sharp impression of the type was developed on the paper. When the type was heated to 300° C. and similarly pressed against untreated paper, no permanent impression was made.

The 2,2-dicyano-3,3-di(polyfluoroalkyl)oxiranes of this invention are readily hydrolyzed in alkaline media to give the corresponding bisamides with the oxirane ring intact. This is in sharp contrast to related isomeric oxiranes which undergo opening of the oxirane ring on attempted alkaline hydrolysis. The products of this invention are thus useful as intermediates in preparing polymeric materials, for example polyamides, which can be crosslinked after they have been formed into fibers or other extruded objects by treatment to open the oxirane rings in the polymer chains. The oxirane rings provide sites for crosslinking which are stable at the high temperatures employed, e.g., in melt-spinning operations, and hence, spontaneous cross-linking is minimized.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

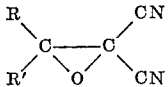

wherein R and R' each represent a member of the group consisting of perfluoroalkyl, ω-chloroperfluoroalkyl and ω-hydroperfluoroalkyl, each of up to 18 carbons, and R and R' conjointly are perfluoroalkylene of 3 to 8 carbons.

2. 2,2-dicyano-3,3-bis(trifluoromethyl)oxirane.

3. A compound of the formula

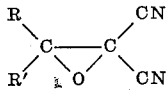

wherein R and R' each represent perfluoroalkyl of up to 8 carbons.

References Cited by the Examiner

UNITED STATES PATENTS

| | | | |
|---|---|---|---|
| 2,456,768 | 12/48 | Chaney | 260—348 XR |
| 2,549,892 | 4/51 | Chaney | 260—348 XR |
| 2,561,516 | 7/51 | Ladd et al. | 260—348 XR |
| 2,724,719 | 11/55 | Markley et al. | 260—348 XR |
| 2,838,524 | 6/58 | Wilson | 260—348.5 |

OTHER REFERENCES

Swern: Chem. Reviews, vol. 45, pp. 1–68 (1949).

WALTER A. MODANCE, *Primary Examiner.*